427-419.2 SR
3/9/86 XR RE 32,244

United States Patent [19]

Andersen

[11] E Patent Number: Re. 32,244

[45] Reissued Date of Patent: Sep. 9, 1986

[54] METHODS AND APPARATUS FOR APPLYING WEAR RESISTANT COATINGS TO ROTOGRAVURE CYLINDERS

[75] Inventor: Dennis Andersen, Medford, N.J.

[73] Assignee: Armotek Industries, Inc., Palmyra, N.J.

[21] Appl. No.: 426,959

[22] Filed: Sep. 29, 1982

Related U.S. Patent Documents

Reissue of:

[64] Patent No.: 4,262,034
Issued: Apr. 14, 1981
Appl. No.: 89,474
Filed: Oct. 30, 1979

[51] Int. Cl.[4] ..... B05D 1/08

[52] U.S. Cl. ..... 427/34; 219/121 PL; 406/138; 427/419.2; 427/419.7; 427/423

[58] Field of Search ..... 427/34, 399, 318, 330, 427/419.2, 419.7, 423; 406/123, 138, 172; 156/89; 219/121 PL; 428/698

[56] References Cited

U.S. PATENT DOCUMENTS

| | | | |
|---|---|---|---|
| 1,120,879 | 12/1914 | Zorn . | |
| 2,123,537 | 7/1938 | Marr | 406/138 |
| 2,339,899 | 1/1948 | Wilson | 406/123 |
| 2,554,432 | 5/1951 | Walters | 406/123 |
| 2,919,160 | 12/1959 | Blackburn . | |
| 3,006,838 | 10/1961 | Johnson . | |
| 3,197,328 | 7/1965 | Jung et al. . | |
| 3,412,898 | 11/1968 | Marynowski | 406/138 |
| 3,419,415 | 12/1968 | Dittrich | 427/423 |
| 3,440,733 | 4/1969 | Reuter . | |
| 3,527,575 | 9/1970 | Thompson . | |
| 3,529,359 | 9/1970 | Fukuyo . | |
| 3,598,374 | 8/1971 | Nauta . | |
| 3,795,058 | 3/1974 | Ganiaris . | |
| 3,867,114 | 2/1975 | Doig . | |
| 3,923,484 | 12/1975 | Randall | 427/423 |
| 4,009,658 | 3/1977 | Heurich | 427/423 |
| 4,064,311 | 12/1977 | McLean et al. | 428/539 |
| 4,073,265 | 2/1978 | Walling et al. | 427/25 |
| 4,132,006 | 1/1979 | Scholz . | |

*Primary Examiner*—John H. Newsome
*Attorney, Agent, or Firm*—Burns, Doane, Swecker & Mathis

[57] ABSTRACT

A coating of wear resistant tungsten carbide is applied to a photo-etched roto-gravure cylinder, the coating having a thickness in the range of from 15 to 35 microns. Tungsten carbide powder is supplied to a plasma flame spray gun by means of a powder feeder which supplies powder particles at a uniform density and at given sizes. The feeder comprises a hopper having air inlet and outlet passages and vertically spaced porous membranes which confine the powder and permit the passage of air. Air flow through the hopper suspends the powder particles of a desired diameter range adjacent a spray gun feed conduit. When copper cylinders are to be coated, the surface is allowed to oxidize to promote a chemical bonding of the coating to the surface.

33 Claims, 3 Drawing Figures

METHODS AND APPARATUS FOR APPLYING WEAR RESISTANT COATINGS TO ROTOGRAVURE CYLINDERS

Matter enclosed in heavy brackets [ ] appears in the original patent but forms no part of this reissue specification; matter printed in italics indicates the additions made by reissue.

BACKGROUND AND OBJECTS OF THE INVENTION

The present invention relates to the application of tungsten carbide coatings to photo-engraved roto-gravure cylinders, especially roto-gravure printing cylinders.

Roto-gravure cylinders are commonly employed as metering or anilox rolls to transfer uniform coatings of ink or the like, and as printing rolls to transfer a specific ink pattern. Such cylinders are generally fabricated by a photo-engraving process wherein a cellular surface is produced on the cylinder periphery which functions to receive ink from a source, and transfer it to a web or another roll.

Since roto-gravure rolls are subject to rapid wear, and to the corrosive effects of printing inks, it has been common to plate such rolls with substances such as copper or chrome to maximize durability. Plating with copper and chrome is very expensive and does not provide as much durability as a tungsten carbide coating. Tungsten carbide coatings have been applied with some success to mechanically engraved metering rolls by a flame spray technique, but such success has not been achieved in connection with roto-gravure printing rolls. In that regard, the presently utilized flame spray techniques result in the application of a coating which is excessively thick for roto-gravure printing rolls and thus diminishes the definition of the cell pattern.

For example, the disclosure of a tungsten carbide coating of 0.002 to 0.008 inches on a metering roll in U.S. Pat. No. 4,009,658 would be excessively thick for a gravure printing roll. Although the cells are not filled to such an extent as to unduly impair the performance of a gravure metering roll, a gravure printing roll coated to this thickness cannot perform at acceptably high levels of quality in most instances. Accordingly, gravure printing rolls continue to be coated with more costly and less durable copper and substances, such as chrome, which can be applied in sufficiently thin coatings.

When applying coatings of substances such as chrome to copper roto-gravure printing cylinders, grit-blasting step has been performed to form a pitted surface on the copper surface to facilitate adherence thereto of the coating, the latter entering the surface pits to create a mechanical bond between the coating and the cylinder. Prior to the application of the coating, the copper surface is thoroughly cleaned and special precautions are taken to prevent oxidation of the copper surface since the formation of a copper oxide film has been herefore considered to be detrimental. It would be desirable to eliminate the need for the grit-blasting step which adds appreciably to the fabrication costs of the cylinder.

It is therefore, an object of the present investigation to provide novel methods and apparatus for coating roto-gravure cylinders.

It is another object of the invention to enable tungsten carbide to be applied to roto-gravure printing cylinders, especially roto-gravure printing cylinders, in a relatively thin layer.

It is a further object of the invention to enable a tungsten carbide coating to be flame sprayed onto a roto-gravure cylinder at a thickness in the range of from 15 to 35 microns.

It is an additional object of the present invention to eliminate the need for a grit-blasting step for the application of wear-resistant coatings to copper roto-gravure cylinders and rolls.

It is yet another object of the invention to create a chemical bonding between coatings, such as of tungsten carbide, and copper roto-gravure cylinders and rolls.

SUMMARY OF THE INVENTION

These objects are achieved by the present invention which involves feeding powder to a plasma flame spray gun for applying a coating to a roto-gravure cylinder. The apparatus comprises a powder hopper defining an internal chamber. The hopper includes a gas inlet at a lower end thereof for introducing pressurized gas into the chamber, and a gas outlet at an upper end of the chamber for exhausting gas from the chamber. A lower porous membrane is disposed across the chamber above the gas inlet and an upper porous membrane is disposed across the chamber above the lower membrane and below the gas outlet. The upper and lower porous membranes are pervious to the gas and impervious to the powder. A powder discharge opening communicates with the chamber between the porous membranes for conducting powder to the spray gun. Pressurized gas is supplied to the gas inlet for suspending powder particles within the chamber between the upper and lower membranes such that particles of a selected size range are suspended at a substantially uniform density adjacent the powder discharge opening and are discharged therethrough.

Preferably, tungsten carbide particles are fed from the hopper to deposit a coating of tungsten carbide on the cylinder in the range of from 15 to 35 microns thickness.

The invention is particularly advantageous in connection with the coating of photo-etched roto gravure printing cylinders because the thin coating does not unduly impair the printing performance.

Another aspect of the invention involves a method for coating a copper surface of a roto-gravure cylinder with a wear resistant substance comprising the steps of cleaning the copper surface, forming a film of copper oxide on essentially the entire copper surface, and spraying the wear-resistant substance in molten form from a plasma flame spray gun onto the copper oxide film to form the coating. By forming a copper oxide film, a chemical bonding of the coating is achieved, which eliminates a grit blasting step which is needed in cases where a mechanical bonding is achieved.

THE DRAWING

These and other objects and features of the invention will become apparent from the claims and from the following description when read in conjunction with the accompanying drawings.

DETAILED DESCRIPTION OF A PREFERRED EMBODIMENT OF THE INVENTION

Figure 1:
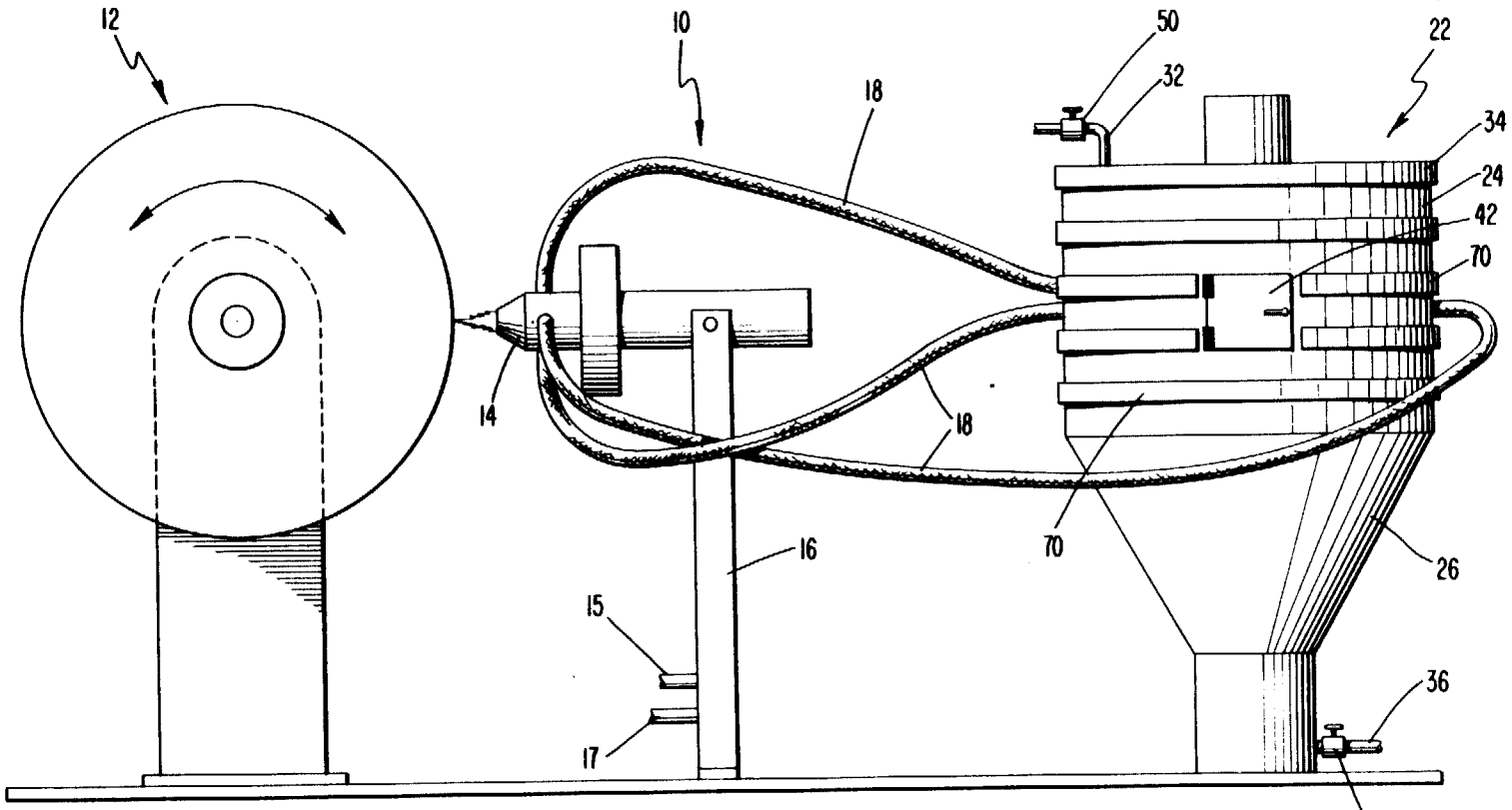
FIG. 1 is a schematic view of a system for applying a tungsten carbide coating to a roto gravure roll according to the present invention.
Figure 2:
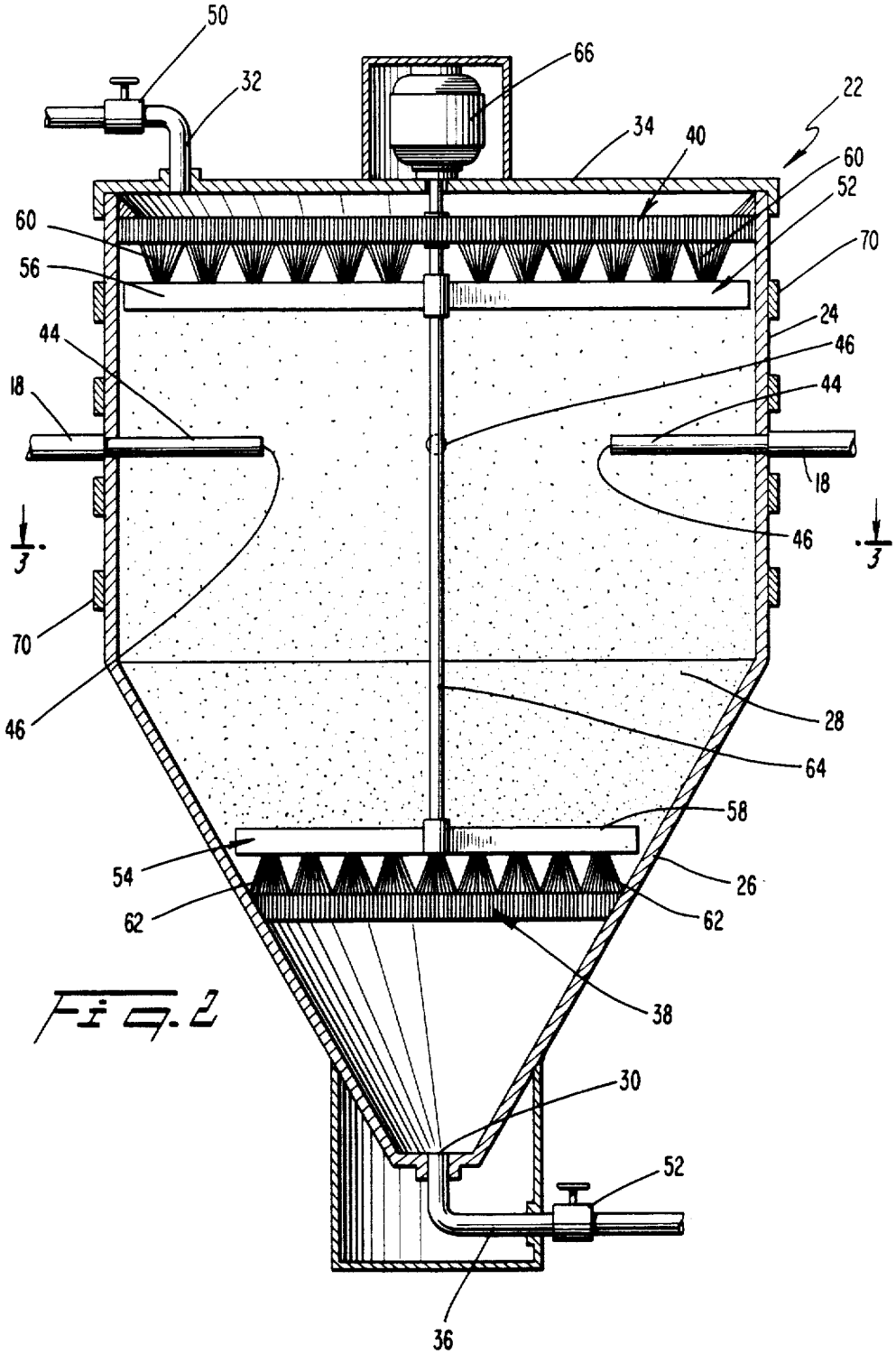
FIG. 2 is a vertical cross-sectional view through a powder feeding mechanism of the system.
Figure 3:
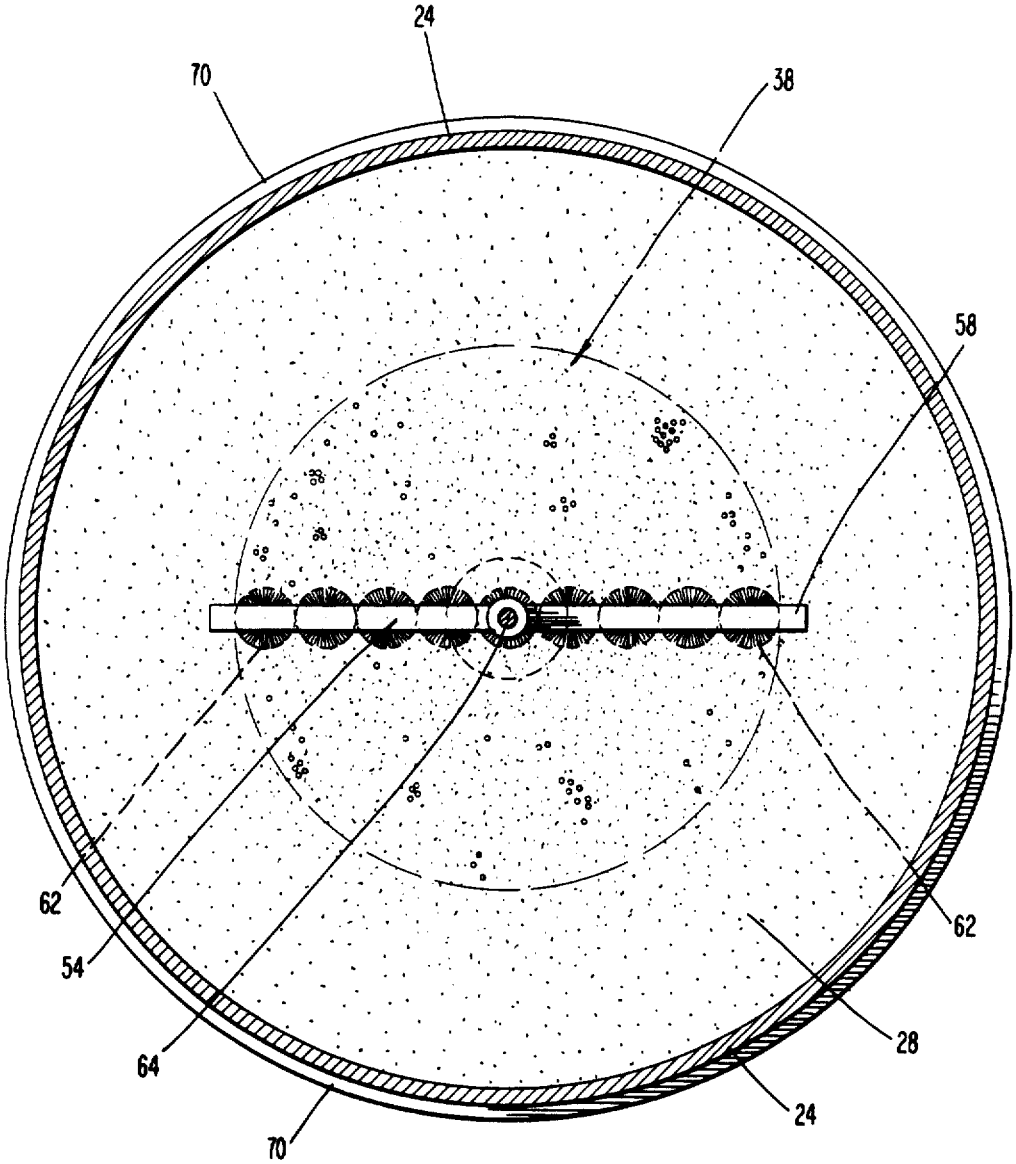
FIG. 3 is a cross-sectional view taken along line 3—3 of FIG. 2.

A system 10 is depicted in FIG. 1 for applying a coating of tungsten carbide to a photo-etched rotor-gravure roll 12. The coating system includes a plasma flame spray gun 14 of a conventional type which is mounted on a movable carrier 16. An electric supply conduit 15 and an argon gas supply conduit 17 extend within the carrier and feed into the flame gun. Powder supply hoses 18 communicate a feed mechanism 20 with the flame gun for conducting a powder, preferably tungsten carbide, to the gun. The spray gun itself is well known and further details thereof are not needed. Suffice it to say that an electric arc is established by the gun which melts tungsten carbide powder particles that are introduced into the gun. The melt is then sprayed from the gun by the argon gas.

As is conventional, the gravure roll 12 is mounted for rotation about its longitudinal axis and the gun carrier 16 is mounted for translational motion in a direction parallel to the roller axis. The rotational speed of the roller and the translational speed of the gun are correlated so that the entire periphery of the roller is coated.

As noted earlier, in order for the cells of a gravure printing roll coated with tungsten carbide to print with required definition, the coating must be applied thin enough to avoid an excessive fill-in of the gravure cells of the roll. For example, an acceptable coating is one applied at a thickness in the range of from 15 to 35 microns, depending upon the cell size of the particular gravure roll being treated. In this regard, it is preferable that the selected thickness be controlled within a tolerance of 2.5 microns.

In order to achieve this goal with the flame spray process,it is virtually essential that the density of the sprayed tungsten carbide powder particles remain uniform and constant, and that the size of the sprayed powder particles lie within a given range. Substantial difficulties have been heretofore encountered in achieving these requirements. In this regard, it is noted that commercially available batches of tungsten carbide powders contain particles of an excessively wide range of diameters.

Accordingly, the powder feed mechanism 20 of the present invention has been provided which enables a gravure printing roll to be coated with a sufficiently thin layer of tungsten carbide, i.e., within a range of 15 to 35 microns.

The powder feed mechanism comprises a hopper 22 having a cylindrical upper portion 24 of circular cross section and a conical lower portion 26 of circular cross section defining an internal chamber 28. An entrance 30 for a gas, such as air, is provided at a lower end of the conical portion 26, and an air outlet 32 is provided in a cover 34 which covers the upper portion 24. An air delivery duct 36 (FIG. 1) supplies a stream of pressurized air which enters the chamber 28 through the inlet 30 and exits the chamber through the outlet 32.

Extending completely across the cross section of the conical portion 26 above the air inlet 30 is a lower circular porous membrane 38, and extending completely across the cross section of the cylindrical portion 24 below the air outlet 32 is an upper circular porous membrane 40. The membranes 38, 40 are conventional and comprise microporous polyethylene with a mesh size in the range of 5 to 10 microns, which is sufficient to conduct gas flow but prevent the passage of powder particles. A membrane thickness of ⅛" is preferred.

Disposed in the wall of the cylindrical portion 24 is a closable loading hatch 42 through which tungsten carbide powder can be introduced into the chamber 28.

Before a feeding operation commences, powder within the hopper 22 rests upon the lower membrane 38.

A series of powder discharge tubes 44, preferably four in number, are positioned equidistantly around the cylindrical portion 24 and communicate with the plasma gun 14 by means of the flexible hoses 18. The discharge tubes 44 lie in a horizontal plane located at a level approximately midway along the height of the cylindrical portion 24. The inlet ends 46 of the tubes 44 are positioned approximately midway between the central vertical axis of the hopper and the wall 48 of the cylindrical portion 24.

By passing air through the chamber 28, the tungsten carbide powder therewithin becomes suspended and dispersed within the chamber.

At a given constant air velocity, powder particles of similar volume tend to remain suspended at a particular level and density within the chamber. The discharge tubes 44 are positioned at a level corresponding to a desired particle size and density. By varying the air velocity, those characteristics of the suspended powder can be controlled.

The air velocity and pressure are controlled by regulators 50, 52 in the air inlet and outlet lines. In this fashion, it is possible to regulate the discharge velocity of the particles through the discharge tubes 44. For example, it is preferable to maintain a pressure of 20–25 psi through the chamber 28 when feeding tungsten carbide particles.

In order to prevent the upper and lower membranes 40, 38 from becoming clogged with powder, a pair of upper and lower rotary cleaner brushes 52, 54 are employed to "scrub" the powder-contacting surfaces of those membranes. The brushes 52, 54 each comprise a plurality of radial spokes 56, 58 to which carry bristles 60, 62. The spokes 56, 58 are connected to a common drive shaft 64 extending vertically axially through the hopper 22. A drive motor 66 is attached to the shaft to drive the brushes 52, 54 at selected speeds. The bristles 60, 62 are positioned to engage the membranes and scrub powder particles therefrom. This assures that the lower membrane will be unobstructed and available to pass air to the powder, and that a uniform density level of powder will be present adjacent the lower membrane for contact with the air stream.

During the travel of air through the chamber 28, a swirling air stream is established due to the conical configuration of the lower portion 26 of the hopper. Such swirling action creates a random flow pattern of the powder particles, assuring that a uniform particle density (i.e., particle count per volume) is established within the chamber 28.

Heavier powder particles may tend to gravitate downwardly along the sides of the hopper. Such particles are caused to approach the center of the hopper, due to the inwardly sloping nature of the wall of the conical portion 26. Those particles are maintained in a fluidized cloud above the lower membrane and, gradually gravitate downwardly onto the membrane 38, whereupon they are immediately propelled upwardly by the air flow through the lower membrane. The lower brush 54 stirs the particles and prevents undue clogging of the membrane 38.

The height to which the particles may rise in the chamber, for a given air pressure, is a function of the size of the particles and the air velocity within the chamber. That is, heavier particles will not be lifted as high as the lighter particles per a given air velocity. It has been found that for a given air pressure through the chamber, the powder particles will be suspended at a substantially uniform density, with particles of generally common size being situated at a respective level in the chamber. Thus, by suitable regulation of air pressure through the chamber, particles of a desired size can be discharged through the discharge tubes 44. Accordingly, it will be appreciated that the feeder mechanism functions to classify particles according to size.

Moreover, the heavier, unwanted particles will remain suspended at the lower end of the chamber and may eventually be disposed of when the coating operation is finished.

A plurality of heating elements 70 are positioned around the exterior of the cylindrical portion 24 to maintain the chamber at a temperature sufficient to eliminate condensation which could otherwise be absorbed by the powder. It has been found that such a goal can be achieved by maintaining the chamber at about 150° F.

It will be appreciated that the particle feeding mechanism is adapted to applying a tungsten carbide coating or the like to all types of roto-gravure cylinders.

In the fabrication of a copper roto-gravure printing cylinder 12, the cylinder is initially photo-etched in a conventional manner. Thereafter, the cylinder 12 is mounted in a rotational machine and is thoroughly cleaned with trichloroethylene ($C_2HCL_3$) to remove soil that may be present on the surface. The cylinder is then rotated and pre-heated, using the moving plasma torch as a heat source, until a desired temperature of the cylinder, preferably from 110°–120° F., is obtained. The preheating cycle removes moisture that might be entrapped in the microporous surfaces of the engraved areas on the cylinder. The cylinder 12 is then cleaned again with trichloroethylene to remove any oils that may have exuded during the pre-heating cycle.

As noted earlier, care has heretofore been taken to prevent the occurrence of appreciable oxidation of the copper surface because oxidation was believed to be detrimental to the application of the coating. However, it has now been discovered that by promoting oxidation, a chemical bond can be established between the copper surface and the tungsten carbide coating.

Accordingly, oxidation is promoted by exposing the copper surface to air for a selected period, e.g., about fifteen minutes, or by heating the surface by a flame torch (with the powder feeder 20 maintained inactive). Accordingly, a film of copper oxide is established on essentially the entire cylindrical surface of the cylinder, resulting in a chemical bond being created with the subsequently-applied tungsten carbide coating. While the inventor does not wish to be held to a specific theory, it is surmised that a crystal lattice structure is formed between the copper surface and the tungsten carbide coating to create such mechanical bond.

The copper oxide film which is established on the copper surface can be cupric oxide, cuprous oxide or a combination of both.

The chemical bond which is created is significant in that it eliminates the mechanical grit-blasting operation which has heretofore been performed in the conventional mechanical bonding of the coating to the cylinder. The chemical bonding according to the present invention is more adherent and there is no distortion of the cell structure as can result from grit-blasting.

It is possible that, heretofore, during performance of the prior art coating techniques, a slight amount of oxidation may have incidentally occurred on the copper cylinder surface prior to application of the wear-resistant coating, despite efforts taken to prevent same. However, if essentially the entire copper surface has been oxidized, the coating would not be applied. Rather, the surface would be re-cleaned before commencement of the coating step.

After being formed, the oxidized film is preheated with the flame torch preferably to a temperature in the range of from 180° F. to 220° F. Preheating is accomplished, as before, by means of the flame torch 14 with the cylinder rotating and the powder feeder inactive.

After the preheating step, the torch 14 is returned to a starting position and fixed at the proper distance from the face of the cylinder for a coating step. The powder feeder is activated by forcing air through the air inlet 30 of the powder-containing chamber 28. Air passing through the container entrains the powder particles and suspends them at a substantially uniform density within the chamber, with particles of common sizes becoming situated at respective levels within the chamber. The inlet and outlet pressure valves are to achieve a desired air velocity and powder density within the chamber to assure that particles of a diameter in the range of from 1 to 8 microns are disposed at the level of the powder discharge tubes 44. The valves are also adjusted to achieve a desired powder velocity through the powder discharge tubes 44. The brushes 38, 40 are rotated to eliminate powder build-up on the upper and lower membranes.

The cylinder 12 is then rotated at the desired speed and the torch 14 is translated at the desired speed as a plasma stream of tungsten carbide is emitted from the torch.

Powder particles in the range of from 1 to 8 microns are supplied at a uniform density to the torch, enabling a coating to be applied which is of uniform thickness in the range of from 15 to 35 microns, a coating which was heretofore not possible to achieve with consistent uniformity. After the completion of the coating operation, the cylinder is transferred to a wet polishing machine.

The end result is a gravure printing cylinder having a much higher resistance to abrasion and erosion, and a life expectancy nearly ten times that of a conventional chromium plated cylinder.

The thin, uniform coating made possible by the present invention is ideally suited to roto-gravure printing cylinders because the definition of the printing cells is not destroyed. It will be appreciated, of course, that the present invention is also applicable to the coating of roto-gravure metering or anilox cylinders with tungsten carbide.

The creation of a copper oxide film on the copper surface of a roto-gravure rolls prior to the coating of tungsten carbide, enables the coating to be bonded chemically, thereby eliminating the conventional grit blasting step.

For principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. Apparatus for feeding powder to a plasma flame spray gun for applying a coating to a roto-gravure cylinder, said apparatus comprising:

a powder hopper defining an internal chamber which includes a lower conical portion and an upper cylindrical portion, said hopper including a gas inlet at a lower end thereof for introducing pressurized gas into said chamber, and a gas outlet at an upper end of said chamber for exhausting gas from said chamber, a lower porous membrane disposed across said chamber above said gas inlet and below at least part of said conical portion such that gas passing through said lower membrane enters said conical portion and is caused to swirl, an upper porous membrane disposed across said chamber above said lower membrane and below said gas outlet, said upper and lower porous membranes being pervious to said gas and impervious to said powder, powder discharge opening means opening into said cylindrical portion of said chamber between upper and lower ends of said cylindrical portion and between said porous membranes, said discharge opening means arranged to conduct powder to the spray gun, and means for supplying pressurized gas to said gas inlet for suspending powder particles within said chamber between said upper and lower membranes such that suspended particles of a selected size range are suspended at a substantially uniform density adjacent said powder discharge opening means and are discharged therethrough.

2. Apparatus according to claim 1, wherein said discharge opening means faces substantially radially.

3. Apparatus according to claim 1 wherein said powder discharge opening means are disposed in said cylindrical portion.

4. Apparatus according to claim 3 wherein said powder discharge opening means comprise a plurality of tubes extending into said chamber.

5. Apparatus according to claim 4 wherein the inlet ends of said tubes extend radially approximately midway between a wall of said cylindrical portion and a vertical central axis of said hopper.

6. Apparatus according to claim 1 including driven brush means for brushing powder from the lower surface of said upper membrane and the upper surface of said lower membrane.

7. Apparatus according to claim 6 wherein said brush means comprise a pair of brushes mounted on a common vertical drive shaft, such brush including a horizontal bristle holder and bristles mounted therein.

8. Apparatus according to claim 1 including gas pressure regulating means for controlling gas pressure at said inlet and gas pressure at said outlet.

9. Apparatus according to claim 1 including heating means for heating said chamber.

10. Apparatus for applying a coating of tungsten carbide at a thickness of from 15 to 35 microns to a roto-gravure cylinder, comprising:

a plasma flame spray gun for emitting a spray of molten tungsten carbide, and means for feeding tungsten carbide particles to said spray gun at a substantially uniform density, said feeding means comprising:

a hopper comprising a lower conically shaped portion and an upper cylindrically shaped portion, said portions defining an inner chamber of said hopper for containing tungsten carbide powder, said hopper including a gas inlet at a lower end of said conical portion and a gas outlet at an upper end of said cylindrical portion, a lower porous membrane disposed across said conical portion above said gas inlet and below at least part of said conical portion such that gas passing through said lower membrane enters said conical portion and is caused to swirl, an upper porous membrane disposed across said cylindrical portion below said air outlet, said upper and lower membranes being pervious to said gas and impervious to said powder, powder discharge opening means in said cylindrical portion opening into said cylindrical portion of said chamber between upper and lower ends of said cylindrical portion and between said membranes, said powder discharge opening means being connected to said spray gun, and means for supplying pressurized gas to said gas inlet for suspending said powder within said chamber between said upper and lower membranes such that suspended particles of 1 to 8 microns in diameter are suspended at a substantially uniform density adjacent said powder discharge opening means and are discharged therethrough.

11. Apparatus according to claim 10 wherein said powder discharge opening means comprise a plurality of tubes extending into said chamber.

12. Apparatus according to claim 11 wherein the inlet ends of said tubes extend radially approximately midway from a wall of said cylindrical portion to a vertical central axis of said hopper.

13. Apparatus according to claim 10 including driven brush means for brushing powder from the lower surface of said upper membrane and the upper surface of said lower membrane.

14. Apparatus according to claim 13 wherein said brush means comprise a pair of brushes mounted on a common vertical drive shaft, such brush including a horizontal bristle holder and bristles mounted therein.

15. Apparatus according to claim 10 including gas pressure regulating means for controlling gas pressure at said inlet and gas pressure at said outlet.

16. Apparatus according to claim 10 including heating means for said chamber.

17. Apparatus for applying a coating of tungsten carbide to a roto-gravure cylinder in the range of from 15 to 35 microns thickness, said apparatus comprising:

a plasma flame spray gun for emitting a spray of molten tungsten carbide, and means for feeding tungsten carbide powder particles of from 1 to 8 microns diameter to said spray gun at a substantially uniform density, said feeding means comprising:

a chamber-defining hopper including an upper cylindrical portion, a lower conical portion, an inlet at a lower end of said conical portion for delivering pressurized air to said chamber, an air outlet disposed at an upper end of said cylindrical portion for exhausting air from said chamber, and means for admitting tungsten carbide powder into said chamber, a lower porous membrane disposed across said conical portion above said air inlet, an upper porous membrane disposed across said cylindrical portion below said air outlet, said upper and lower porous membranes being pervious to air and impervious to said powder, said lower membrane disposed below at least part of said conical portion such that gas passing through said lower membrane enters said conical portion and is caused to swirl, powder discharge opening means opening into said cylindrical portion between upper and lower ends of said cylindrical portion and between said porous membranes, means for supplying pressurized air to said air inlet for suspending tungsten carbide particles within said chamber between said upper and lower membranes such that suspended particles from 1 to 8 microns diameter are suspended at a substantially uniform density adjacent said powder discharge means and are conducted therethrough to said plasma flame spray gun, pressure control means for controlling air pressure at said air inlet and air outlet, upper and lower rotary brush means engageable with a top surface of said lower membrane a bottom surface of said upper porous membrane, respectively, and means for rotating said upper and lower brush means about a vertical axis to brush particles from said top and bottom surfaces during passage of air through said chamber.

18. A method for applying a coating of tungsten carbide to a roto-gravure cylinder comprising the steps of:

suspending tungsten carbide powder particles in a gas flow within a hopper such that particles having a diameter of from 1 to 8 microns are suspended at a substantially uniform density adjacent a powder discharge of said hopper, conducting said suspended particles from said discharge to a plasma flame spray torch, and melting said particles in said torch and spraying the melt agains the surface of a roto-gravure cylinder to form a tungsten carbide coating of from 15 to 35 microns thickness thereon.

19. A method according to claim 18 wherein said entraining step comprises the steps of providing said particles in said hopper between upper and lower porous membranes, introducing gas into said hopper beneath said lower membrane and exhausting said gas from said hopper above said upper membrane, whereby said gas suspends said powder particles between said membranes.

20. A method according to claim 19 including the step of brushing powder particles from a lower surface of said upper membrane and from an upper surface of said lower membrane as said particles are suspended.

21. A method according to claim 18 wherein said molten spray is applied to a roto-gravure printing cylinder.

22. A method according to claim 18, wherein said cylinder comprises a copper cylindrical surface, and wherein prior to said melting and spraying step, a film of copper oxide is formed on essentially the entire copper surface, and said molten spray being applied to said copper oxide film.

23. A method of coating a copper surface of a roto-gravure cylinder with a wear resistant substance comprising the steps of:

cleaning the cylindrical copper surface of said cylinder, forming a film of copper oxide on essentially the entire cylindrical copper surface of said cylinder, and spraying said wear-resistant substance in molten form onto said copper oxide film to form said coating.

24. A method according to claim 23 wherein said wear resistant substance is tungsten carbide.

25. A method according to claim 24 wherein said coating is applied to a thickness of from 15 to 35 microns.

26. A method according to claim 23 wherein said copper oxide film is preheated prior to said spraying step.

27. A method according to claim 26 wherein said copper oxide film is preheated to a temperature in the range of from 180° F. to 220° F.

28. Method according to claim 23 wherein said forming step comprises exposing said cylindrical surface to air.

29. Method according to claim 23 wherein said forming step comprises subjecting said cylindrical surface to heat.

30. Method according to claim 24 including the step of entraining tungsten carbide powder particles in a gas stream within a hopper such that particles having a diameter of from 1 to 8 microns are suspended at a substantially uniform density adjacent a powder discharge of said hopper, and conducting said suspended particles from said discharge to a flame spray gun.

31. Apparatus according to claim 10, wherein said discharge opening means faces substantially radially.

32. Apparatus according to claim 17, wherein said discharge opening means faces substantially radially.

*33. A method for applying a coating of wear-resistant material to a roto-gravure cylinder comprising the steps of:*

*suspending powder particles of said wear-resistant material in a gas flow within a hopper such that particles having a diameter of from 1 to 8 microns are suspended at a substantially uniform density adjacent a powder discharge of said hopper,*

*conducting said suspended particles from said discharge to a plasma flame spray torch, and melting said particles in said torch and spraying the melt against the surface of the workpiece to form a wear-resistant coating of from 15 to 35 microns thickness thereon.*

* * * * *